United States Patent
Mamola (10) Patent No.: US 10,134,412 B2
(45) Date of Patent: Nov. 20, 2018

(54) MULTIRESOLUTION CODING AND MODULATION SYSTEM

(71) Applicant: Shure Acquisition Holdings, Inc., Niles, IL (US)

(72) Inventor: Robert Mamola, Oak Park, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 360 days.

(21) Appl. No.: 14/844,678

(22) Filed: Sep. 3, 2015

(65) Prior Publication Data

US 2017/0069333 A1     Mar. 9, 2017

(51) Int. Cl.
| | |
|---|---|
| *G10L 19/26* | (2013.01) |
| *G10L 19/22* | (2013.01) |
| *G10L 19/02* | (2013.01) |
| *H04L 27/34* | (2006.01) |
| *G10L 19/005* | (2013.01) |
| *G10L 19/16* | (2013.01) |
| *H04L 29/06* | (2006.01) |
| *H04L 27/18* | (2006.01) |

(52) U.S. Cl.
CPC .......... *G10L 19/167* (2013.01); *G10L 19/005* (2013.01); *G10L 19/0204* (2013.01); *G10L 19/22* (2013.01); *H04L 27/3488* (2013.01); *H04L 65/607* (2013.01); *H04L 27/183* (2013.01)

(58) Field of Classification Search
CPC ..... G10L 19/167; G10L 19/22; G10L 19/005; G10L 19/0204; H04L 27/3488; H04L 65/607; H04L 27/183
USPC ...................................................... 704/500
See application file for complete search history.

(56) References Cited

U.S. PATENT DOCUMENTS 5,377,194 A * 12/1994 Calderbank ........... H03M 13/35
                                                         370/524
5,561,468 A * 10/1996 Bryan ..................... H04L 7/041
                                                         348/469

(Continued)

FOREIGN PATENT DOCUMENTS

WO    WO 2017040904 A1 *  3/2017 ........... H04B 1/1027

OTHER PUBLICATIONS

Méric, Hugo, and José Miguel Piquer. "DVB-S2 spectrum efficiency improvement with hierarchical modulation." Communications (ICC), 2014 IEEE International Conference on. IEEE, 2014.*
International Search Report and Written Opinion for PCT/US2016/050208 dated Nov. 28, 2016.

(Continued)

*Primary Examiner* — Edwin S Leland, III
(74) *Attorney, Agent, or Firm* — William J. Lenz, Esq.; Neal, Gerber & Eisenberg LLP (57) ABSTRACT

A multiresolution coding and modulation system for preserving audio continuity in a digital wireless audio system in harsh RF environments is provided that includes an audio codec that produces codewords having bits differing in perceptual importance coupled with a non-uniform hierarchical modulation scheme. When the wireless audio system is operating in a harsh RF environment, the RF SNR for decoding bits having a high perceptual importance may be decreased while the RF SNR for decoding bits having a low perceptual importance may be increased, while having no adverse effect on the latency of the wireless audio system. The audio may be subjectively degraded instead of muting the audio, which mitigates intermittent interference and multipath fading issues.

17 Claims, 6 Drawing Sheets

(56) References Cited

U.S. PATENT DOCUMENTS

| | | | | |
|---|---|---|---|---|
| 6,119,083 | A * | 9/2000 | Hollier | G10L 19/018 |
| | | | | 348/742 |
| 6,188,717 | B1 * | 2/2001 | Kaiser | H04B 7/2628 |
| | | | | 375/148 |
| 9,647,865 | B1 * | 5/2017 | Limberg | H04L 27/3427 |
| 9,990,928 | B2 * | 6/2018 | Hardwick | G10L 19/018 |
| 2011/0096814 | A1 * | 4/2011 | Wu | H04L 27/2604 |
| | | | | 375/219 |
| 2011/0222462 | A1 * | 9/2011 | Ho | H04L 27/3488 |
| | | | | 370/312 |
| 2012/0065965 | A1 * | 3/2012 | Choo | G10L 21/038 |
| | | | | 704/203 |
| 2014/0180458 | A1 * | 6/2014 | Nayak | G06F 17/3074 |
| | | | | 700/94 |
| 2016/0217796 | A1 * | 7/2016 | Frey | G10L 19/005 |
| 2017/0068506 | A1 * | 3/2017 | Mamola | G06F 3/165 |
| 2017/0069333 | A1 * | 3/2017 | Mamola | G10L 19/167 |

OTHER PUBLICATIONS

Coudoux, et al., "On the Use of Hierarchical Modulations for Robust Video Transmission over Power Line Medium," 2007 IEEE International Symposium on Power Line Communications and Its Applications, pp. 482-486, Mar. 1, 2007.

Lee-Fang Wei, "Coded Modulation with Unequal Error Protection," IEEE Transactions on Communications, vol. 41, No. 10, Oct. 1993, pp. 1439-1449.

Ramchandran, et al., "Multiresolution Broadcast for Digital HDTV Using Joint Source/Channel Coding," IEEE Journal on Selected Areas in Communications, vol. 11, No. 1, pp. 6-23, Jan. 1993.

* cited by examiner

MULTIRESOLUTION CODING AND MODULATION SYSTEM

TECHNICAL FIELD

This application generally relates to a multiresolution coding and modulation system. In particular, this application relates to a multiresolution coding and modulation system for preserving audio continuity in a digital wireless audio system, and that includes an audio codec that produces codewords having bits differing in perceptual importance coupled with a non-uniform hierarchical modulation scheme.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone, for example, that is held by the user and includes an integrated transmitter and antenna. When the RF signal is received at the wireless audio receiver, the RF signal may be degraded due to multipath fading caused by constructive interference and/or by other types of interference. This degradation may cause the RF signal to have a poor signal-to-noise ratio (SNR), which results in bit errors that can cause audio artifacts. Typically, when significant audio artifacts are present, the output audio is muted. However, muting the output audio is undesirable in many situations and environments. The effects of such multipath fading and interference are most prevalent in harsh RF environments where physical and electrical factors influence the transmission and reception of RF signals, e.g., movement of the microphone within the environment, other RF signals, etc. Furthermore, wireless audio systems typically utilize forward error correction (FEC) in a homogenous manner to account for errors in wireless transmissions, i.e., where the number of added bits are equal to the number of data bits regardless of the perceptual importance of the data bits. This approach effectively wastes spectral bandwidth.

Accordingly, there is an opportunity for a multiresolution coding and modulation system that addresses these concerns. More particularly, there is an opportunity for a multiresolution coding and modulation system that preserves audio continuity in a digital wireless audio system in harsh RF environments by subjectively degrading the audio instead of muting the audio.

SUMMARY

The invention is intended to solve the above-noted problems by providing multiresolution coding and modulation systems and methods that are designed to, among other things: (1) utilize an audio codec that produces codewords having bits differing in perceptual importance coupled with a non-uniform hierarchical modulation scheme in a wireless audio system; (2) decrease the RF SNR for decoding bits having a high perceptual importance; (3) increase the RF SNR for decoding bits having a low perceptual importance; and (4) have no adverse effect on the latency of the wireless audio system.

In an embodiment, a method of communicating an audio signal represented by a digital audio bit stream may include encoding the digital audio bit stream into coarse codeword bits and fine codeword bits, wherein the coarse codeword bits represent high perceptual importance of the audio signal and the fine codeword bits represent low perceptual importance of the audio signal; selecting a symbol of a complex constellation associated with a non-uniform hierarchical digital modulation scheme based on the coarse codeword bits and the fine codeword bits; modulating the symbol into a radio frequency (RF) signal; transmitting the RF signal on a transmitting antenna; receiving the RF signal on a receiving antenna; sampling the received RF signal into a received digital signal; and detecting a received symbol of a complex symbol stream in the received digital signal into bits designating a received quadrant and a received point. If both the bits designating the received quadrant and the bits designating the received point are detected, then the method may also include decoding the received symbol into received coarse codeword bits and received fine codeword bits, based on the received quadrant and the received point; and generating an output digital audio signal based on the received coarse codeword bits and the received fine codeword bits. However, if only the bits designating the received quadrant are detected, the method may include decoding the received symbol into the received coarse codeword bits based on the received quadrant; and generating the output digital audio signal based on the received coarse codeword bits. If neither the bits designating the received quadrant nor the bits designating the received point are detected without error, the method may include generating an audio mute for the output digital audio signal.

In another embodiment, a wireless audio system may include a transmitter having a transmitter audio codec, a multiresolution mapper, a modulator, and a transmitting antenna. The transmitter audio codec may be configured to receive a digital audio bit stream representing an audio signal, and encode the digital audio bit stream into coarse codeword bits and fine codeword bits, wherein the coarse codeword bits represent high perceptual importance of the audio signal and the fine codeword bits represent low perceptual importance of the audio signal. The multiresolution mapper may be in communication with the transmitter audio codec and be configured to select a symbol of a complex constellation associated with a non-uniform hierarchical digital modulation scheme based on the coarse codeword bits and the fine codeword bits. The modulator may be in communication with the multiresolution mapper and be configured to modulate the symbol into a radio frequency (RF) signal, and the transmitting antenna may be in communication with the modulator and be configured to transmit the RF signal.

The wireless audio system may also include a receiver having a receiving antenna, an analog-to-digital converter (ADC), a detector, a multiresolution decoder, and a receiver audio codec. The receiving antenna may be configured to receive the RF signal, and the ADC may be configured to sample the received RF signal into a received digital signal. The detector may be in communication with the receiving antenna and be configured to detect a received symbol of a complex symbol stream in the received digital signal into bits designating a received quadrant and a received point. The multiresolution decoder may be in communication with the detector and be configured to decode the received symbol into received coarse codeword bits and received fine codeword bits, based on the received quadrant and the received point, if both the bits designating the received quadrant and the bits designating the received point are detected; decode the received symbol into the received coarse codeword bits based on the received quadrant, if only the bits designating the received quadrant are detected; and generate an audio mute, if neither the bits designating the received quadrant nor the bits designating the received point are detected. The receiver audio codec may be in communication with the multiresolution decoder and be configured to generate an output digital audio signal based on the received coarse codeword bits and the received fine codeword bits, if both the bits designating the received quadrant and the bits designating the received point are detected; generate the output digital audio signal based on the received coarse codeword bits, if only the bits designating the received quadrant are detected; and generate the output digital audio signal having the audio mute, if neither the bits designating the received quadrant nor the bits designating the received point are detected.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The multiresolution coding and modulation system described herein can be utilized in a wireless audio system having an RF transmitter and an RF receiver to preserve audio continuity by decreasing the RF SNR for decoding bits having a high perceptual importance and increasing the RF SNR for decoding bits having a low perceptual importance, while having no adverse effect on the latency of the wireless audio system. An audio codec that produces codewords having bits differing in perceptual importance may be coupled with a non-uniform hierarchical modulation scheme in the multiresolution coding and modulation system. By subjectively degrading the audio in harsh RF environments instead of muting the audio, as in conventional wireless audio systems, the multiresolution coding and modulation system can help mitigate intermittent interference and multipath fading issues. In addition, the multiresolution coding and modulation system may improve spectral efficiency and have an extended operating range in non-fading environments.

Figure 5:
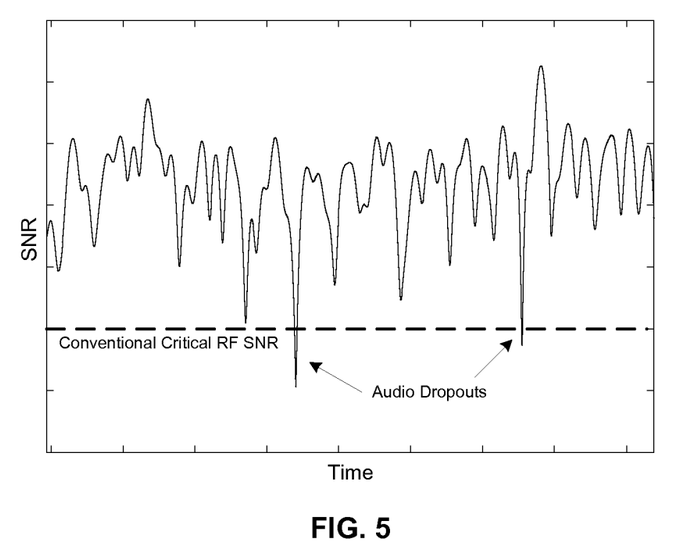
FIG. 5 is an exemplary graph showing the performance of a conventional wireless audio system.

As an example of the benefits of changing the RF SNR for decoding bits with different perceptual importance, FIG. 5 depicts an exemplary graph showing the performance of a conventional wireless audio system that does not have the benefit of the multiresolution coding and modulation system described herein. In FIG. 5, the SNR of a received RF signal on the y-axis is plotted against time on the x-axis. The conventional wireless audio system has a critical RF SNR as shown in FIG. 5 such that when the SNR of the received RF signal is below the critical RF SNR, audio dropouts (i.e., mutes) in the output audio may occur because the audio cannot be decoded successfully.

Figure 6:
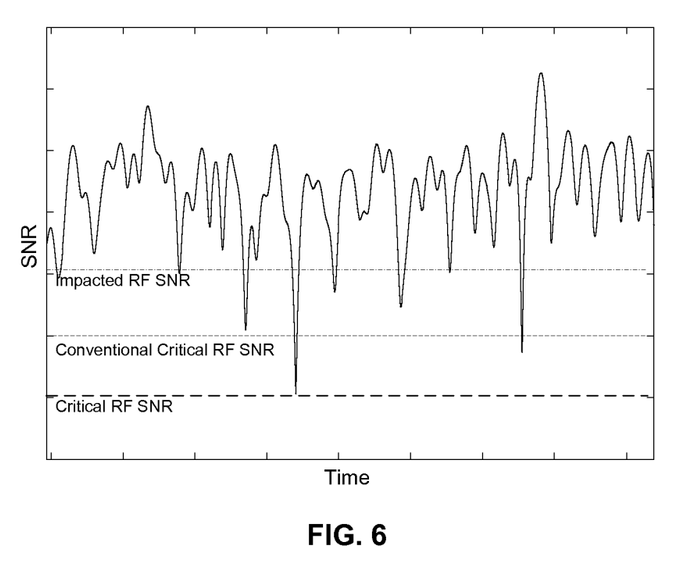
FIG. 6 is an exemplary graph showing the performance of a wireless audio system including the multiresolution coding and modulation system.

In contrast, FIG. 6 depicts an exemplary graph showing the performance of a wireless audio system including the multiresolution coding and modulation system described herein. In FIG. 6, the SNR of a received RF signal on the y-axis is plotted against time on the x-axis. The critical RF SNR of the conventional wireless audio system and the critical RF SNR of the wireless audio system including the multiresolution coding and modulation system are shown in FIG. 6. As can be seen in FIG. 6, by lowering the critical RF SNR for perceptually important audio, audio dropouts (mutes) may be avoided in the output audio because this audio may be decoded successfully. In addition, FIG. 6 shows an impacted RF SNR of the wireless audio system including the multiresolution coding and modulation system that denotes where audio may be impacted in an inconsequential way, e.g., in some embodiments, by band limiting decoded audio to 0 to 12 kHz, instead of a wider range. Audio in the range of 0 to 12 kHz, for example, may be deemed audio that is perceptually important, while audio in a higher frequency range may be deemed less perceptually important. In other embodiments, the audio may be impacted in an inconsequential way by reducing the SNR of the audio. The multiresolution coding and modulation system may be configured such that the higher RF SNR threshold is within the fading margin of the link between the transmitter and the receiver. Consequently, the wireless system would typically operate in a regime where full fidelity audio is present.

Figure 1:
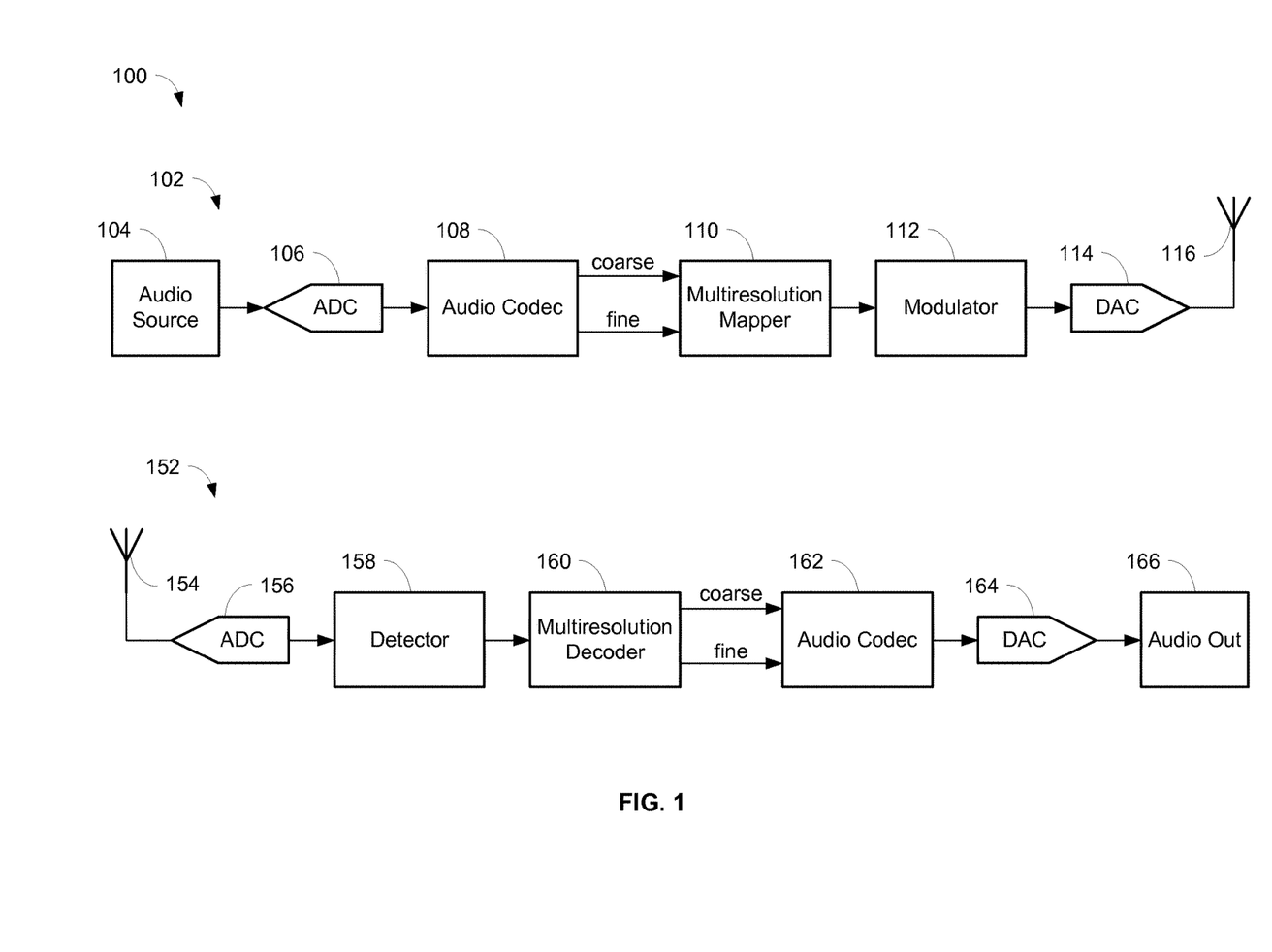
FIG. 1 is a block diagram of a wireless audio system that includes a multiresolution coding and modulation system used in conjunction with an RF transmitter and an RF receiver, in accordance with some embodiments.
Figure 2:
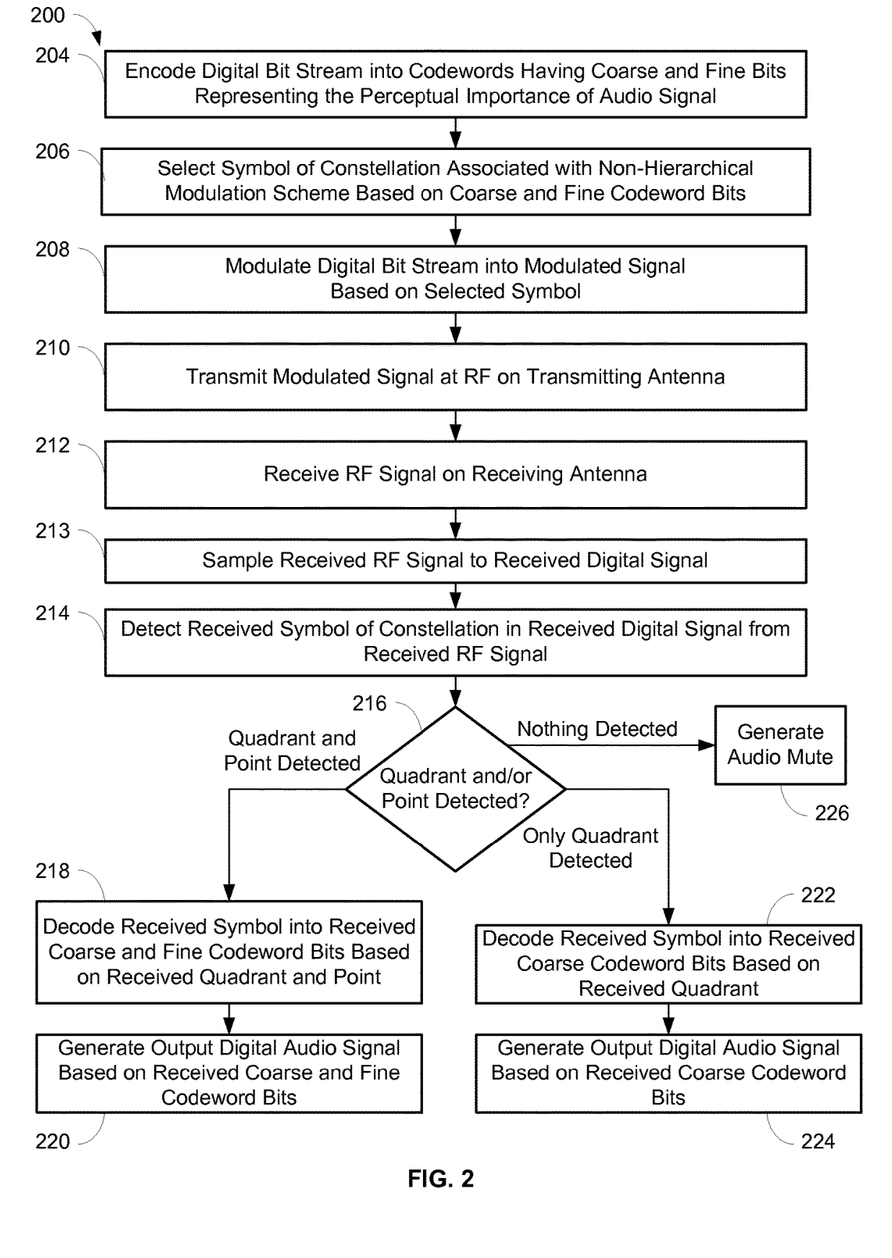
FIG. 2 is a flowchart illustrating operations for communicating an audio signal represented by a digital audio bit stream using a multiresolution coding and modulation system in conjunction with an RF transmitter and an RF receiver, in accordance with some embodiments.

FIG. 1 is an exemplary block diagram of a wireless audio system 100 that includes a multiresolution coding and modulation system. The wireless audio system 100 may include an RF transmitter 102 that transmits an RF signal containing an audio signal from an audio source 104. The RF transmitter 102 may be integrated within a handheld microphone, in some embodiments. The transmitted RF signal may be received by an RF receiver 152 that processes the RF signal to produce an output analog audio signal 166. In some embodiments, the RF receiver 152 may produce a output digital audio signal. The RF receiver may be a rack mountable unit, portable unit, and/or camera mountable unit, in some embodiments. A process 200 that may use the wireless audio system 100 is shown in FIG. 2. In particular, the wireless audio system 100 and the process 200 may utilize the multiresolution coding and modulation system to ensure continuity of audio that is transmitted wirelessly. Various components included in the wireless audio system 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.

The audio source 104, such as a microphone or playback device, may detect and/or produce the audio signal. For example, if the audio source is a microphone, sound may be detected and converted into an audio signal. The audio source 104 may produce an analog audio signal that is modulated and transmitted by the RF transmitter 102. The analog audio signal from the audio source 104 may be converted to a digital audio bit stream by an analog to digital converter (ADC) 106.

An audio codec 108 may receive the digital audio bit stream and produce codewords having bits differing in the perceptual importance of the audio signal, such as at step 204 of the process 200 shown in FIG. 2. In embodiments, the multiresolution coding and modulation system may prioritize the bits of a codeword that encode a perceptually important frequency range of audio. A typical frequency range for human hearing may be from approximately 0-24 kHz. However, certain frequency ranges can be deemed to have a higher perceptual importance than other frequency ranges. For example, the codeword bits corresponding to audio in a frequency range of 0-12 kHz can be assigned to have a high perceptual importance. The codeword bits representing audio in another frequency range, e.g., 12-24 kHz, can be assigned to have a low perceptual importance. In this example, audio with a frequency greater than 12 kHz may be deemed as less important since such audio is typically more difficult to hear. As another example, the codeword bits corresponding to audio in a frequency range of 0-6 kHz can be assigned to have a high perceptual importance, while the codeword bits representing audio in another frequency range, e.g., 6-12 kHz, can be assigned to have a low perceptual importance. In this example, audio with a frequency greater than 6 kHz may be deemed as less important. Other frequency ranges for determining the perceptual importance of audio are possible and contemplated.

In other embodiments, the multiresolution coding and modulation system may prioritize the bits of a codeword whose correct transmission will produce a perceptually acceptable (but decreased) audio SNR. In other words, if only the perceptually important bits of a codeword can be decoded, there may be a reduction in audio SNR as compared to the case when all bits of a codeword can be successfully decoded. For example, in an 8 bit codeword, the four most significant bits may achieve 24 dB of audio SNR and these bits would be considered to be perceptually important. In this example, the four least significant bits of the codeword may represent an additional 24 dB of audio SNR, assuming that the four perceptually important bits are successfully transmitted. In this case, the four least significant bits may be deemed as less important because the first 24 dB of audio SNR is more perceptually relevant than the step from 24 dB to 48 dB.

Accordingly, the audio codec 108 may encode the digital audio bit stream based on the perceptual importance of the audio into codewords having coarse and fine bits, such as at step 204 of the process 200 shown in FIG. 2. The coarse codeword bits may represent the audio having a high perceptual importance that is deemed to be more important. The audio codec 108 may therefore generate coarse codeword bits for this type of audio. The fine codeword bits may represent the audio having a low perceptual importance that is deemed to be less important. The audio codec 108 may therefore generate fine codeword bits for this type of audio.

Figure 4:
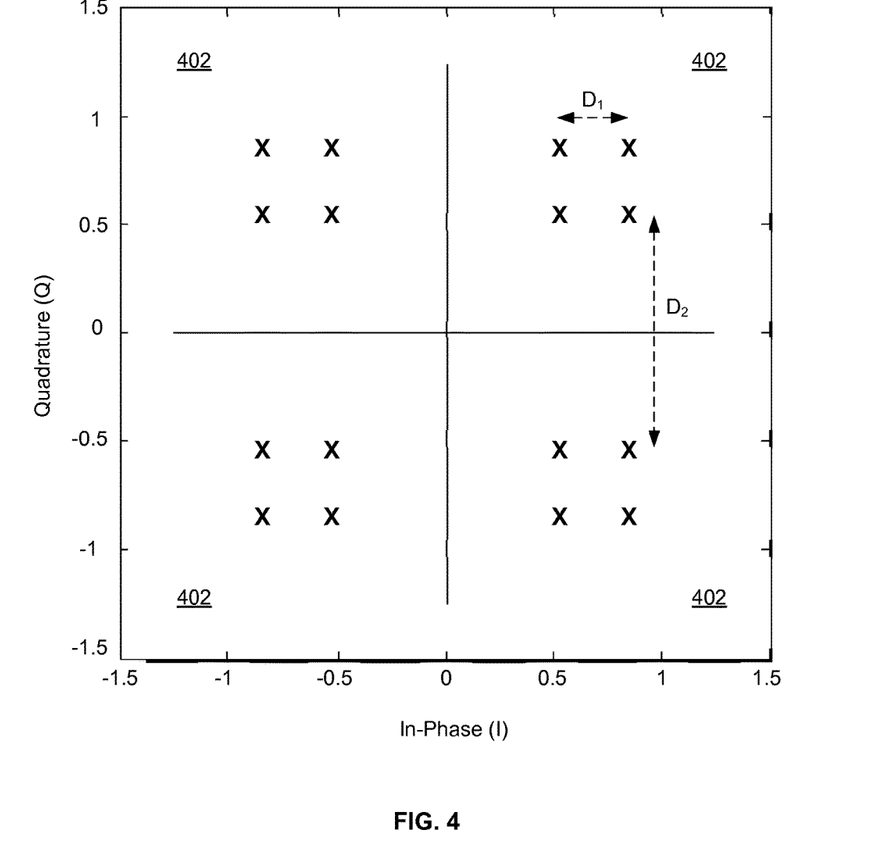
FIG. 4 is an exemplary constellation diagram associated with a non-uniform hierarchical digital modulation scheme, in accordance with some embodiments.

The coarse and fine codeword bits produced by the audio codec 108 may be utilized by a multiresolution mapper 110 in the RF transmitter 102 to select a quadrant and a point (i.e., a symbol) of a constellation associated with a non-uniform hierarchical digital modulation scheme, such as at step 206 of the process 200 shown in FIG. 2. The hierarchical digital modulation scheme may include 16-QAM (quadrature amplitude modulation),32-QAM, M-QAM, M-PSK (phase-shift keying), and/or other suitable linear modulation schemes. An exemplary constellation diagram associated with a 16-QAM modulation scheme is depicted in FIG. 4. The constellation diagram of FIG. 4 represents how a signal may be modulated by the 16-QAM modulation scheme in the complex plane (with in-phase (I) and quadrature (Q) axes), and includes four quadrants 402 and sixteen points (each depicted by "X"). There are four points in each quadrant 402.

The distance between the points and/or the density of the points may be configurable by a parameter $\lambda$. The parameter $\lambda$ may be set based on the particular environment and/or application the wireless audio system 100 is being used in.

In embodiments, the parameter λ is based on distances between quadrants (coarse) and points (fine) in a constellation scaled to have unity root mean squared (RMS) power. In particular the parameter λ may be equal to the minimum Euclidean distance between the points ($D_1$) divided by the minimum Euclidean distance between the quadrants ($D_2$). Exemplary distances $D_1$ and $D_2$ are shown in the constellation diagram of FIG. 4. Other ways of parameterizing a non-uniform hierarchical constellation may be utilized in other embodiments.

The multiresolution mapper 110 can select one of the quadrants 402 based on the coarse codeword bits received from the audio codec 108 and one of the points based on the fine codeword bits received from the audio codec 108. For example, a codeword including the coarse codeword bits and the fine codeword bits from the audio codec 108 may be 16 bits. Eight bits of the codeword may correspond to the coarse bits (i.e., having a higher perceptual importance) and the other eight bits may correspond to the fine bits (i.e., having a lower perceptual importance). In the case where the hierarchical digital modulation scheme is 16-QAM, each point may have two bits of quadrant (coarse) information and two bits of point (fine) information. Therefore, an exemplary codeword of 16 bits would include information to map to four points (symbols) of a 16-QAM constellation.

Figure 7:
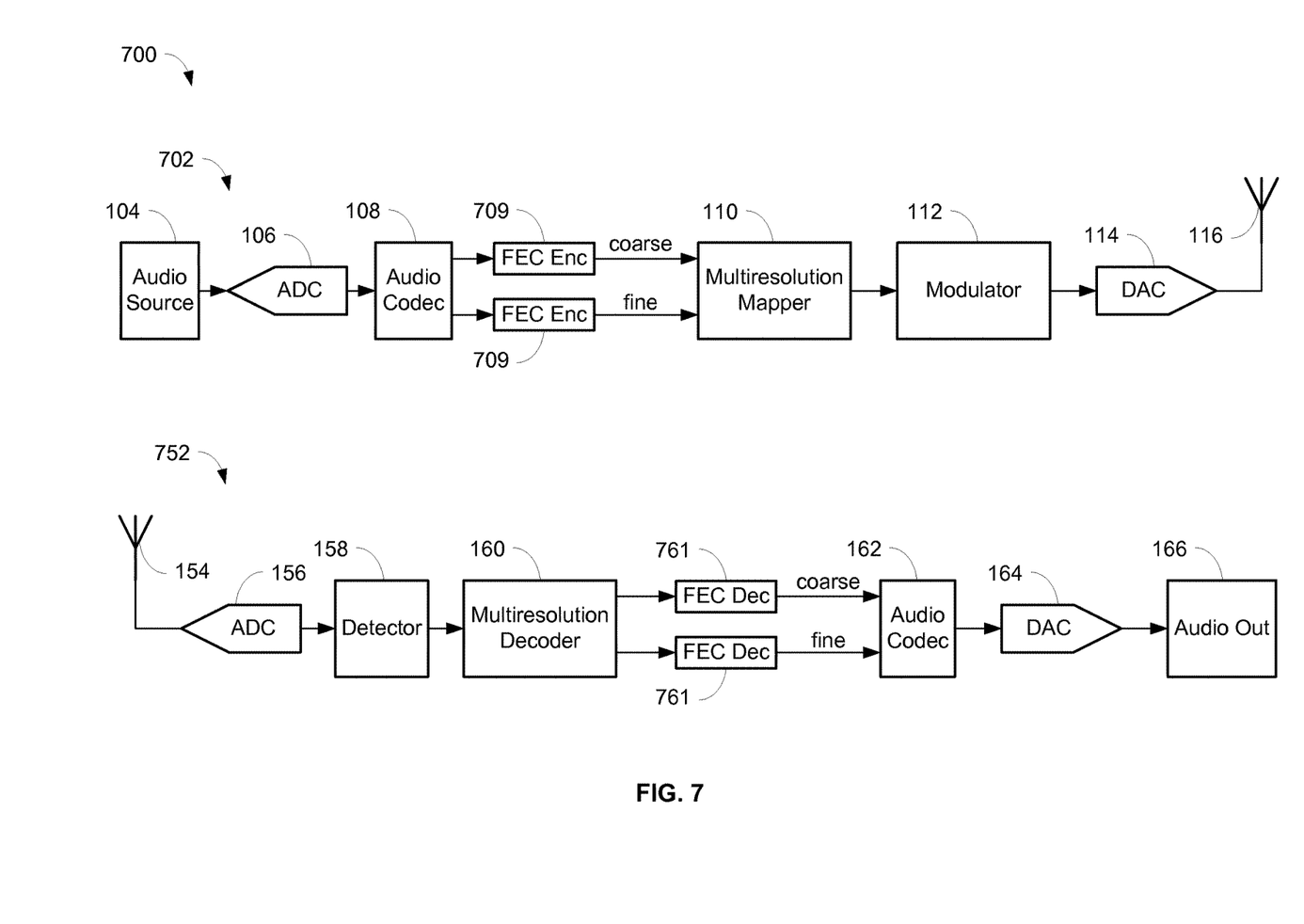
FIG. 7 is a block diagram of a wireless audio system that includes a multiresolution coding and modulation system with forward error correction used in conjunction with an RF transmitter and an RF receiver, in accordance with some embodiments.

In some embodiments, the coarse and fine codeword bits produced by the audio codec 108 may be encoded with a forward error correction (FEC) code, as is known in the art. The use of FEC enables the correction of some bit errors resulting from noise and interference in the received signal. FIG. 7 is an exemplary block diagram of a wireless audio system 700 that includes a multiresolution coding and modulation system having FEC encoders 709 in a transmitter 702, and FEC decoders 761 in a receiver 752. The other components of the wireless audio system 700 are the same as described with relation to FIG. 1. The coarse and fine codeword bits from the audio codec 108 may be encoded by separate FEC encoders 709 in the transmitter 702 that correspond respectively to high perceptual importance audio and low perceptual importance audio. After encoding with FEC, the FEC-encoded coarse and fine codeword bits may be utilized by the multiresolution mapper 110 to select a quadrant and a point (i.e., a symbol) of a constellation, as described above.

A modulator 112 may utilize the selected quadrant and point from the multiresolution mapper 110 to modulate the digital audio bit stream into a modulated signal, such as at step 208 of the process 200. The digital audio bit stream is modulated according to the particular hierarchical digital modulation scheme being utilized, e.g., 16-QAM. In particular, the I and Q signals corresponding to the selected quadrant and the selected point (i.e., symbol) are pulse shaped, as is known in the art, to generate a modulated signal. The modulated signal from the modulator 112 may be converted into analog format by a digital to analog converter (DAC) 114, and subsequently transmitted at RF on a transmitting antenna 116, such as at step 210 of the process 200.

The RF signal from the transmitting antenna 116 may be received at an RF receiver 152 by a receiving antenna 154, such as at step 212 of the process 200. The received RF signal may be sampled and converted into a received digital signal by an ADC 156, such as at step 213 of the process 200. A detector 158 may detect the received symbol specified by an (I, Q) coordinate in the complex plane, as is known in the art, such as at step 214 of the process 200. This symbol should correspond to the constellation associated with the hierarchical digital modulation scheme being utilized. In ideal conditions, both the quadrant and the point of each symbol in the received digital signal would exactly match the quadrant and point in the transmitted signal. However, due to multi-path fading and other types of interference, the received digital signal may have been degraded so that the quadrant and/or the point may not be exactly the same as in the transmitted signal. The received symbol may be provided from the detector 158 to a multiresolution decoder 160 in the RF receiver 152. The detector 158 may also provide nothing to the multiresolution decoder 160 if nothing was detected. Details of how the detector 158 may detect and determine the received symbol in the received digital signal (containing the digital symbol stream) and how the multiresolution decoder 160 may decode the digital symbol stream are described with reference to the process depicted in FIG. 3.

Figure 3:
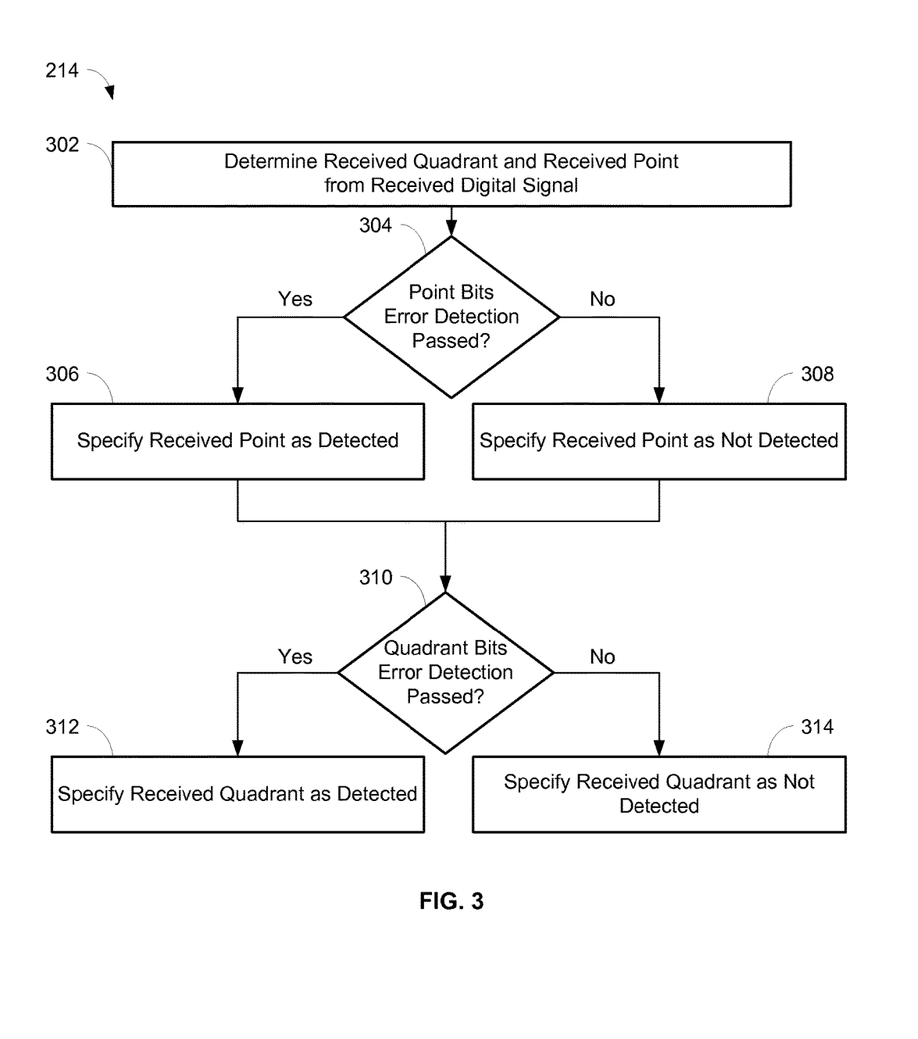
FIG. 3 is a flowchart illustrating operations for detecting a received symbol of the constellation from a received digital signal, in accordance with some embodiments.

The detector 158 may determine the quadrant and the point (i.e., the symbol) from the received digital signal, such as at step 302 of the process 214 shown in FIG. 3. A quadrant and a point may be detected in the received digital signal, but as described previously, it is possible that this quadrant and/or point may not exactly match those in the transmitted signal. The multiresolution decoder 160 may decode the quadrant (coarse) bits and point (fine) bits from the received digital symbol stream. In particular, the multiresolution decoder 160 may receive the particular point (symbol) and blindly decode the quadrant (coarse) bits based upon the quadrant in which the received point is located. Error detection of both the quadrant and point bits may be performed by the multiresolution decoder 160 to ensure that the correct information has been received. In some embodiments, a cyclic redundancy check (CRC) scheme may be utilized as is known in the art. In other embodiments, a soft decoding scheme may be utilized, such as described in concurrently-filed and commonly owned patent application "Soft Decision Audio Decoding System" (Atty. Docket No. 025087-8047 (GLS 02-671)), which is incorporated herein by reference in its entirety.

Error detection on the point bits may be performed, such as at step 304 of the process 214. If the error detection on the point bits passes, then the multiresolution decoder 160 may specify that the received point is detected, such as at step 306 of the process 214. However, if the error detection on the point bits does not pass, then the multiresolution decoder 160 may specify that the received point is not detected, such as at step 308 of the process 214. Next, at step 310 of the process 214, the multiresolution decoder 160 may perform error detection on the quadrant bits. If the error detection on the quadrant bits passes, then the multiresolution decoder 160 may specify that the received quadrant is detected, such as at step 312 of the process 214. However, if the error detection on the quadrant bits does not pass, then the multiresolution decoder 160 may specify that the received quadrant is not detected, such as at step 314 of the process 214. If the process 214 determines that both the received quadrant and received point have been detected, then both the received quadrant and the received point may be utilized to recover the audio. However, if the process 214 determines that only the received quadrant has been detected, then only the received quadrant may be utilized to recover the audio. And, if the process 214 determines that both the received quadrant and received point have not been detected, then an audio mute may be generated into the output audio.

Returning to the process 200 of FIG. 2, the multiresolution decoder 160 may then determine, such as at step 216 of the process 200, whether both the received quadrant and the received point have been detected, whether only the received quadrant has been detected, or whether nothing has been detected. If both the received quadrant and the received point have been detected at step 216, then the multiresolution decoder 160 may decode the received digital symbol into coarse and fine codeword bits, based on the received quadrant and the received point, such as at step 218 of the process 200. In this case, an audio codec 162 in the RF receiver 152 may receive the coarse and fine codeword bits from the multiresolution decoder 160 and generate an output digital audio signal based on the coarse and fine codeword bits, such as at step 220 of the process 200.

However, if only the received quadrant has been detected at step 216, then the multiresolution decoder 160 may decode the received digital symbol into coarse codeword bits based on the received quadrant, such as at step 222 of the process 200. In this case, the audio codec 162 may receive the coarse codeword bits from the multiresolution decoder 160 and generate an output digital audio signal based on only the coarse codeword bits, such as at step 224 of the process 200. If both the received quadrant and the received point have not been detected at step 216, then the multiresolution decoder 160 and audio codec 162 may generate an audio mute, such as at step 226 of the process 200. In some embodiments, the output digital audio signal from the audio codec 162 may be converted into an output analog audio signal 166 by a DAC 164. The output analog audio signal 166 may be utilized as desired, such as being further processed by downstream equipment (e.g., mixers, recorders, etc.), played on loudspeakers, etc.

In some embodiments where the coarse and fine codeword bits have been encoded with FEC in the transmitter (as described above), FEC decoders 761 may decode the coarse and fine codeword bits from the multiresolution decoder 160, as shown in FIG. 7. The coarse and fine codeword bits may be decoded by separate FEC decoders 761 in the receiver 752 that correspond respectively to high perceptual importance audio and low perceptual importance audio. After FEC decoding, the decoded coarse and fine codeword bits may be utilized by the audio codec 162 to generate an output digital audio signal and/or an output analog audio signal, as described above.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A method of communicating an audio signal represented by a digital audio bit stream, comprising:
   encoding the digital audio bit stream into coarse codeword bits and fine codeword bits, wherein the coarse codeword bits represent high auditory perceptual importance of the audio signal and the fine codeword bits represent low auditory perceptual importance of the audio signal;
   selecting a symbol of a complex constellation associated with a non-uniform hierarchical digital modulation scheme based on the coarse codeword bits and the fine codeword bits;
   modulating the symbol into a radio frequency (RF) signal;
   transmitting the RF signal on a transmitting antenna;
   receiving the RF signal on a receiving antenna;
   sampling the received RF signal into a received digital signal;
   detecting a received symbol of a complex symbol stream in the received digital signal into bits designating a received quadrant and a received point;
   if both the bits designating the received quadrant and the bits designating the received point are detected:
      decoding the received symbol into received coarse codeword bits and received fine codeword bits, based on the received quadrant and the received point; and
      generating an output digital audio signal based on the received coarse codeword bits and the received fine codeword bits;
   if only the bits designating the received quadrant are detected:
      decoding the received symbol into the received coarse codeword bits based on the received quadrant; and
      generating the output digital audio signal based on the received coarse codeword bits; and
   if neither the bits designating the received quadrant nor the bits designating the received point are detected without error, generating an audio mute for the output digital audio signal.

2. The method of claim 1, wherein encoding the digital audio bit stream comprises:
   designating the coarse codeword bits as representing the audio signal having the high auditory perceptual importance in a perceptually important frequency range; and
   designating the fine codeword bits as representing the audio signal having the low auditory perceptual importance in a less perceptually important frequency range.

3. The method of claim 2, wherein:
   the perceptually important frequency range is from approximately 0 kHz to approximately 12 kHz; and
   the less perceptually important frequency range is from approximately 12 kHz to approximately 24 kHz.

4. The method of claim 1, wherein encoding the digital audio bit stream comprises:
   designating the coarse codeword bits as representing the audio signal with a minimally perceptually acceptable signal-to-noise ratio (SNR); and
   designating the fine codeword bits as representing the audio signal with an SNR in excess of the minimally perceptually acceptable SNR established by the coarse codeword bits.

5. The method of claim 1, wherein the hierarchical digital modulation scheme comprises 16-quadrature amplitude modulation (QAM).

6. The method of claim 1, wherein a distance between points of the constellation associated with the hierarchical digital modulation scheme is configurable based on a parameter $\lambda$ equal to a minimum Euclidean distance $D_1$ between points of the constellation divided by a minimum Euclidean distance $D_2$ between quadrants of the constellation.

7. The method of claim 1, wherein detecting the received symbol comprises:
determining the received quadrant and the received point from the received digital signal;
performing error detection on the bits designating the received point;
specifying the received point as detected from the received digital signal, if the error detection on the bits designating the received point passes;
specifying the received point as not detected from the received digital signal, if the error detection on the bits designating the received point does not pass;
performing error detection on the bits designating the received quadrant;
specifying the received quadrant as detected from the received digital signal, if the error detection on the bits designating the received quadrant passes; and
specifying the received quadrant as not detected from the received digital signal, if the error detection on the bits designating the received quadrant does not pass.

8. The method of claim 1:
further comprising encoding the coarse codeword bits and the fine codeword bits with a forward error correction (FEC) code;
wherein detecting the received symbol comprises:
decoding the received symbol encoded with the FEC code;
determining the received quadrant and the received point from the FEC-decoded received symbol;
performing error detection on the bits designating the received point;
specifying the received point as detected, if the error detection on the bits designating the received point passes;
specifying the received point as not detected from the received digital signal, if the error detection on the bits designating the received point does not pass;
performing error detection on the bits designating the received quadrant;
specifying the received quadrant as detected from the received digital signal, if the error detection on the bits designating the received quadrant passes; and
specifying the received quadrant as not detected from the received digital signal, if the error detection on the bits designating the received quadrant does not pass;
wherein selecting the symbol comprises selecting the symbol based on the FEC-encoded coarse codeword bits and the FEC-encoded fine codeword bits.

9. A wireless audio system, comprising:
(A) a transmitter, comprising:
(1) a transmitter audio codec configured to:
receive a digital audio bit stream representing an audio signal; and
encode the digital audio bit stream into coarse codeword bits and fine codeword bits, wherein the coarse codeword bits represent high auditory perceptual importance of the audio signal and the fine codeword bits represent low auditory perceptual importance of the audio signal;
(2) a multiresolution mapper in communication with the transmitter audio codec, the multiresolution mapper configured to select a symbol of a complex constellation associated with a non-uniform hierarchical digital modulation scheme based on the coarse codeword bits and the fine codeword bits;
(3) a modulator in communication with the multiresolution mapper, the modulator configured to modulate the symbol into a radio frequency (RF) signal; and
(4) a transmitting antenna in communication with the modulator, the transmitting antenna configured to transmit the RF signal; and
(B) a receiver, comprising:
(1) a receiving antenna configured to receive the RF signal;
(2) an analog-to-digital converter configured to sample the received RF signal into a received digital signal;
(3) a detector in communication with the receiving antenna, the detector configured to detect a received symbol of a complex symbol stream in the received digital signal into bits designating a received quadrant and a received point;
(4) a multiresolution decoder in communication with the detector, the multiresolution decoder configured to:
decode the received symbol into received coarse codeword bits and received fine codeword bits, based on the received quadrant and the received point, if both the bits designating the received quadrant and the bits designating the received point are detected;
decode the received symbol into the received coarse codeword bits based on the received quadrant, if only the bits designating the received quadrant are detected; and
generate an audio mute, if neither the bits designating the received quadrant nor the bits designating the received point are detected; and
(5) a receiver audio codec in communication with the multiresolution decoder, the receiver audio codec configured to:
generate an output digital audio signal based on the received coarse codeword bits and the received fine codeword bits, if both the bits designating the received quadrant and the bits designating the received point are detected;
generate the output digital audio signal based on the received coarse codeword bits, if only the bits designating the received quadrant are detected; and
generate the output digital audio signal having the audio mute, if neither the bits designating the received quadrant nor the bits designating the received point are detected.

10. The wireless audio system of claim 9, wherein the transmitter audio codec is configured to encode the digital audio bit stream by:
designating the coarse codeword bits as representing the audio signal having the high auditory perceptual importance in a perceptually important frequency range; and
designating the fine codeword bits as representing the audio signal having the low auditory perceptual importance in a less perceptually important frequency range.

11. The wireless audio system of claim 10, wherein:
the perceptually important frequency range is from approximately 0 kHz to approximately 12 kHz; and
the less perceptually important frequency range is from approximately 12 kHz to approximately 24 kHz.

12. The wireless audio system of claim 9, wherein the transmitter audio codec is configured to encode the digital audio bit stream by:
designating the coarse codeword bits as representing the audio signal with a minimally perceptually acceptable signal-to-noise ratio (SNR); and
designating the fine codeword bits as representing the audio signal with an SNR in excess of the minimally perceptually acceptable SNR established by the coarse codeword bits.

13. The wireless audio system of claim 9, wherein the hierarchical digital modulation scheme comprises 16-quadrature amplitude modulation (QAM).

14. The wireless audio system of claim 9, wherein a distance between points of the constellation associated with the hierarchical digital modulation scheme is configurable based on a parameter $\lambda$ equal to a minimum Euclidean distance $D_1$ between points of the constellation divided by a minimum Euclidean distance $D_2$ between quadrants of the constellation.

15. The wireless audio system of claim 9, wherein the detector is configured to detect the received symbol by:
determining the received quadrant and the received point from the received digital signal;
performing error detection on the bits designating the received point;
specifying the received point as detected from the received digital signal, if the error detection on the bits designating the received point passes;
specifying the received point as not detected from the received digital signal, if the error detection on the bits designating the received point does not pass;
performing error detection on the bits designating the received quadrant;
specifying the received quadrant as detected from the received digital signal, if the error detection on the bits designating the received quadrant passes; and
specifying the received quadrant as not detected from the received digital signal, if the error detection on the bits designating the received quadrant does not pass.

16. The wireless audio system of claim 9:
further comprising:
a first forward error correction (FEC) encoder in communication with the transmitter audio codec and the multiresolution mapper, the first FEC encoder configured to encode the coarse codeword bits with a FEC code;
a second FEC encoder in communication with the transmitter audio codec and the multiresolution mapper, the second FEC encoder configured to encode the fine codeword bits with the FEC code;
a first FEC decoder in communication with the multiresolution decoder and the receiver audio codec, the first FEC decoder configured to decode the received symbol encoded with the FEC code; and
a second FEC decoder in communication with the multiresolution decoder and the receiver audio codec, the second FEC decoder configured to decode the received symbol encoded with the FEC code;
wherein the detector is configured to detect the received symbol by:
determining the received quadrant and the received point from the FEC-decoded received symbol;
performing error detection on the bits designating the received point;
specifying the received point as detected, if the error detection on the bits designating the received point passes;
specifying the received point as not detected from the received digital signal, if the error detection on the bits designating the received point does not pass;
performing error detection on the bits designating the received quadrant;
specifying the received quadrant as detected from the received digital signal, if the error detection on the bits designating the received quadrant passes; and
specifying the received quadrant as not detected from the received digital signal, if the error detection on the bits designating the received quadrant does not pass;
wherein the multiresolution mapper is configured to select the symbol by selecting the symbol based on the FEC-encoded coarse codeword bits and the FEC-encoded fine codeword bits.

17. The wireless audio system of claim 9, wherein:
the transmitter further comprises a first analog to digital converter in communication with the transmitter audio codec and an audio source providing the audio signal, the first analog to digital converter configured to convert the audio signal to the digital audio bit stream;
the modulator comprises a first digital to analog converter in communication with the modulator and the transmitting antenna, the first digital to analog converter configured to convert the modulated symbol to the RF signal; and
the receiver further comprises a second digital to analog converter in communication with the receiver audio codec, the second digital to analog converter configured to convert the output digital audio signal to an output analog audio signal.

\* \* \* \* \*